United States Patent [19]
Whetten

[11] 3,740,553
[45] June 19, 1973

[54] METHOD AND APPARATUS FOR MEASURING SIZE DISTRIBUTION OF PARTICLES USING A TWO-DIMENSIONAL ALTERNATING CURRENT ELECTRIC FIELD

[75] Inventor: Nathan Rey Whetten, Burnt Hills, N.Y.

[73] Assignee: General Electric Company, Schenectady, N.Y.

[22] Filed: Feb. 2, 1972

[21] Appl. No.: 222,774

[52] U.S. Cl.. 250/41.9 DS, 250/41.9 G, 250/41.9 D
[51] Int. Cl. .............................................. H01j 39/34
[58] Field of Search ............... 250/41.9 DS, 41.9 D, 250/41.9 G

[56] References Cited
UNITED STATES PATENTS 3,075,076  1/1963  Gunther ...................... 250/41.9 DS
3,626,179  12/1971 Cohen ........................ 250/41.9 TF
3,648,046  3/1972  Denison ...................... 250/41.9 DS Primary Examiner—James W. Lawrence
Assistant Examiner—C. E. Church
Attorney—John F. Ahern, Julius J. Zaskalicky and Louis A. Moucha

[57] ABSTRACT

The size distribution of particles including particulate matter in a gas sample is determined by generating a two-dimensional alternating current electric field for mass-selective sorting of the particles whereby condensible vapor saturated charged particles in the gas sample which are in a particular range of charge-to-mass ratio, are directed to an expansion chamber. An expansion of the gas in the expansion chamber causes condensation of droplets on the particles, and a condensation nuclei counter may be used for detecting the number of the droplets which corresponds to a like number of the particles in the particular range of charge-to-mass ratio in the gas sample.

19 Claims, 4 Drawing Figures

Patented June 19, 1973  3,740,553
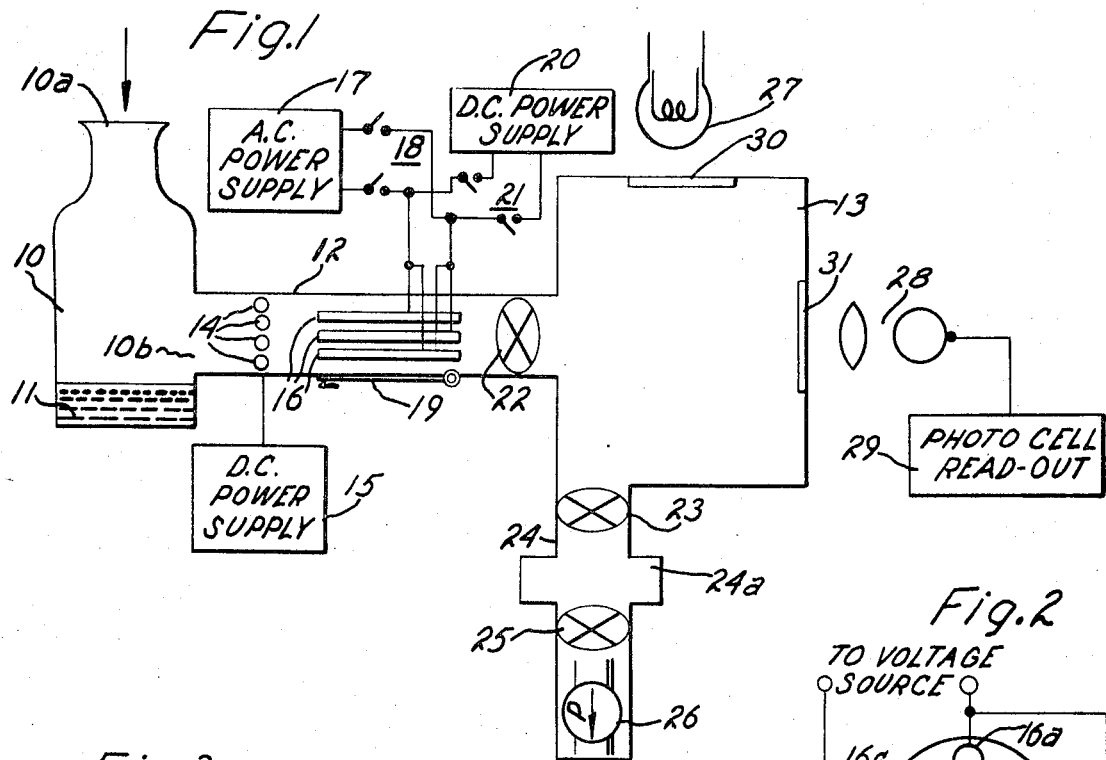
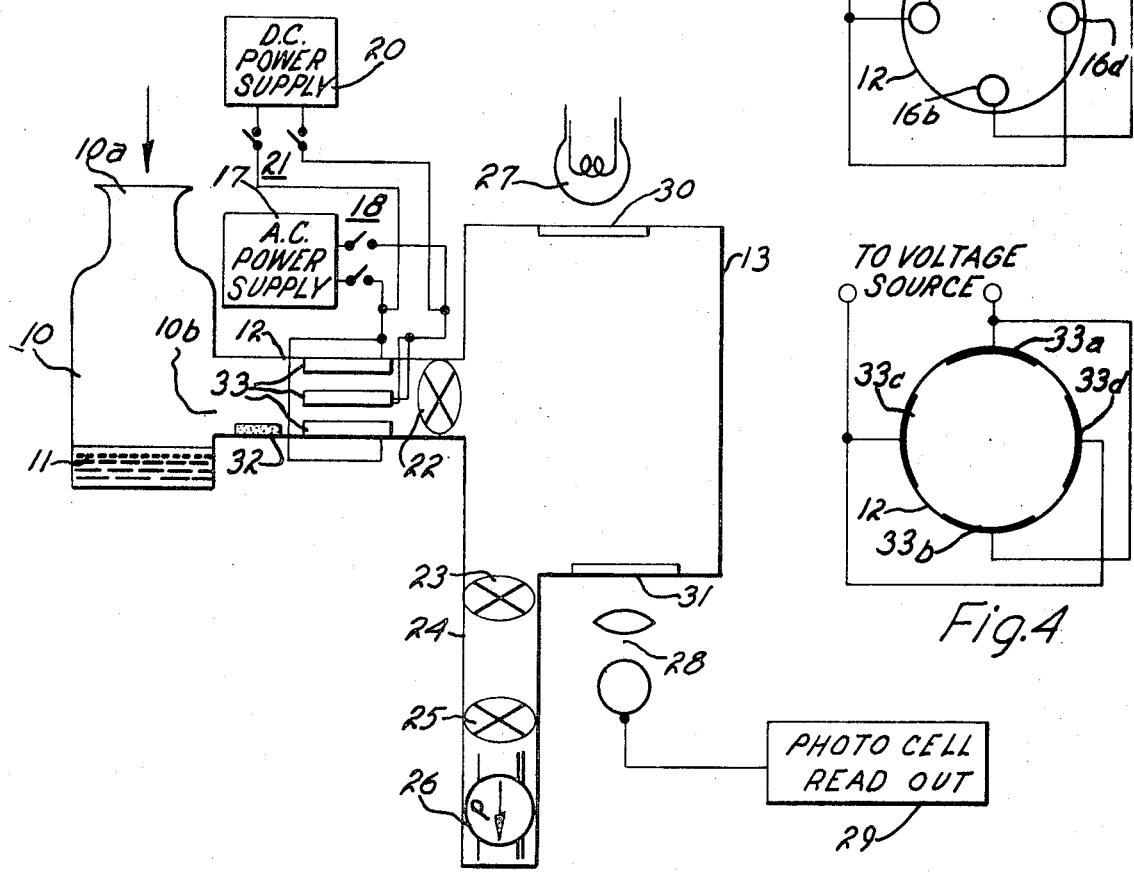

METHOD AND APPARATUS FOR MEASURING SIZE DISTRIBUTION OF PARTICLES USING A TWO-DIMENSIONAL ALTERNATING CURRENT ELECTRIC FIELD

My invention relates to a method and apparatus for measuring the size distribution of particles including particulate matter in a gas sample, and in particular, to a method and apparatus employing a two-dimensional quadrupole mass filter for selecting charged particles in particular ranges of charge-to-mass ratio, and a condensation nuclei detector.

There are many applications for an apparatus capable of monitoring the size and quantity of particles including particulates in various types of gaseous environment including the atmosphere. As examples, broad area monitoring is utilized for determining the degree of contamination in the atmosphere, and small area monitoring for determining contamination in areas such as factory rooms in which are being manufactured dust-sensitive electronic components and the like. Such apparatus is also useful in determining the efficiency of various type particle filters such as those employed in air conditioners.

The conventional condensation nuclei detector can measure the total number of particulates but cannot readily determine their size distribution. A common method for determining particle size is electrostatic precipitation followed by electron microscope analysis, but this is a tedious, nonautomatic technique, and thus is not available for continuous, automatic monitoring of a particular environment or gas sample. Recently, there has been developed a particle size analyzer using mobility separation of the particles in a D.C. electric field, but large currents of air and a discharge ionizing technique are necessary for obtaining a readable current on the electrometer detector employed. Disadvantages of the mobility separator are (1) the gas flow rate through the mobility detector is critical and the detector counter accepts the gas in pulses, (2) particle separation depends on the proximity of the particles to an electrode, and (3) the mobility detector passes all particles except those with a mobility high enough to be separated out at a given voltage thereby requiring the taking of differences between successive readings in order to obtain the number of particles in a given size range. This inability to conveniently determine both the size and distribution of particulates is especially true for particulates of sizes less than 0.1 micron in diameter. These are the sizes that cannot be filtered out by conventional techniques and thus can become a contamination problem in various manufacturing processes as well as causing biological damage. Extensive knowledge of the size distribution is important since it may permit identification of the type and source of the contaminant particles.

Therefore, one of the principal objects of my invention is to provide an improved method and apparatus for measuring the size distribution of particles in a gaseous environment.

Another object of my invention is to provide the method and apparatus for measuring size distribution of particles including particulates especially having sizes less than 0.1 micron diameter.

A further object of my invention is to provide the method and apparatus for measuring particle size distribution which is relatively simple and the apparatus is not sensitive to the rate of flow of the gas therethrough.

A still further object of my invention is to provide a component of the apparatus which is readily adapted for connection to a conventional condensation nuclei detector.

In accordance with my invention, I provide an apparatus and method for measuring the size distribution of particles including particulate matter in a gas sample utilizing a two-dimensional multipolar alternating current electrodynamic field and a condensation nuclei detector. At the input end of the apparatus I provide a means for saturating the gas sample with a condensible vapor and pass the condensible vapor saturated gas sample through a duct to an expansion chamber. Within the duct is positioned a means for generating a two-dimensional alternating current electric field for mass-selective sorting of the particles in the gas sample whereby charged particles within a particular range of charge-to-mass ratio are directed to the expansion chamber and charged particles outside such range are filtered out. An expansion of the vapor-saturated gas sample in the expansion chamber produces cooling and supersaturation thereof whereby droplets condense on the particles and are detected by a condensation nuclei counter to thereby determine the relative number of the particles in the particular range of charge-to-mass ratio. Variation of the voltage or frequency applied to the two-dimensional alternating current electric field generating means permits measurement of particles in different ranges of charge-to-mass ratio to thereby obtain the size distribution thereof.

The features of my invention which I desire to protect herein are pointed out with particularity in the appended claims. The invention itself, however, both as to its organization and method of operation, together with further objects and advantages thereof may best be understood by reference to the following description taken in connection with the accompanying drawing wherein like parts in each of the several figures are identified by the same reference character and wherein:

FIG. 1 is a diagrammatic representation of a first embodiment of a particle size distribution measuring apparatus in accordance with my invention;

FIG. 2 illustrates the orientation of the four electrically conductive rods in the duct depicted in FIG. 1 for generating a two-dimensional alternating current electric field:

FIG. 3 is a diagrammatic representation of a second embodiment of my invention; and FIG. 4 illustrates the orientation of the four strips of electrically conductive paint on the inner surface of the duct in FIG. 3 for generating the two-dimensional alternating current electric field.

Referring now to FIG. 1, there is shown a first embodiment of an apparatus for measuring the size distribution of particles including particulate matter in accordnace with my invention. In particular, a suitable vessel 10 is provided for saturating a gas sample with a readily condensible vapor. The gas sample containing various particles which are to be analyzed in accordance with their size distribution is supplied to vessel 10 through an input end 10a thereof. Particles are defined herein as including both molecules and the larger size particulate matter. The gas sample to be analyzed is drawn into vessel 10 due to the generation of a partial vacuum in the apparatus by a pump at the output end of the apparatus to be described hereinafter. The input end 10a of vessel 10 is open to the atmosphere when analyzing the particles therein, and would be connected to the output of a filter device such as an air conditioner when testing the efficiency thereof. Vessel 10 may assume any of a number of forms and its size is determined primarily by the size of the gas sample to be analyzed. Vessel 10 is partially filled with a relatively high vapor pressure liquid such as water or alcohol, and the output end 10b of the vessel is oriented relative to the top surface of the liquid and the input end 10a of the vessel such that the gas sample passes along the top surface of the liquid 11 in close proximity thereto for achieving a high degree of saturation with the readily condensible vapor. As one example, vessel 10 may be a flask provided with a hole through its side located just slightly above the top surface of the liquid 11.

A duct 12 having an input end connected to the output 10b of vessel 10 provides a means for passage of the gas sample to an expansion chamber 13. Although my invention is applicable for measurement of the size distribution of particles in many types of gaseous environments, it will be described with reference to an air sample as one typical example. It is known that particles in the atmosphere often carry electrical charges, but in many cases such charges may be so small as to negate their use in my apparatus. For this purpose, and with the understanding that it may not be necessary in all applications, especially when it is known that the particles involved are in fact sufficiently charged, a means for electrically charging the particles is provided near the input end of duct 12. As one example, the particle electrical charging means may consist of a planar array of spaced parallel bare electrical conductors 14 extending across substantially the total cross-sectional area within duct 12 and oriented preferably normal to the axis of the air flow. Conductors 14 are preferably of equal size in the range of 0.002 to 0.050 inch diameter and are preferably equally spaced apart in a range of 0.25 to 2.0 inch. Conductors 14 may pass separately through the wall of duct 12 and the ends of alternate conductors are connected to a D.C. high voltage source 15 which has a voltage output in the order of 10 to 20 kilovolts, and the other conductors are grounded, or, grounded plates are positioned between adjacent conductors all of which are connected to source 15. The D.C. voltage applied to conductors 14 is sufficiently high to cause a corona discharge around each of the conductors which thereby electrically charges the particles in the gas sample (air) flowing thereby. Alternatively, the conductors 14 connected to the D.C. source have their ends connected to a common bus within duct 12 adjacent a wall thereof, and the bus passes through the wall for its connection to the D.C. source. In this latter arrangement of conductors 14, the ends of the conductors may be retained in an electrically insulated frame member positioned along the inner surfaces of duct 12. Conductors 14 may be oriented horizontally, or vertically, or at other angles, as desired. Duct 12 may be fabricated of an electrically non-conductive material such as plastic, or alternatively, of a conductive material such as aluminum or other metal. In the latter case, electrical conductors 14 are suitably electrically insulated from the walls of duct 12. Duct 12 is preferably straignt and may be of various shapes, a circular or square cross section being a typical and simple form.

Downstream of electrical charge producing means 14 and positioned within duct 12 is a means for generating a two-dimensional alternating current electric field which provides mass-selective sorting of the charged particles, directing charged particles to the expansion chamber 13 which are in a particular range of charge-to-mass ratio whereas charged particles which are outside the particular range of charge-to-mass ratio are filtered out of the gas sample flow. A suitable means for obtaining this charged particle or ion mass-selective sorting comprises a structure of four electrified cylindrical rods 16 fabricated of an electrically conductive material such as copper or aluminum, and oriented in 90° angularly spaced apart relationship in close proximity to the wall of duct 12 and parallel to the longitudinal axis thereof. The rod conductors 16 are suitably rigidly supported from the inner surfaces of duct 12 and connected to an A.C. power supply 17 through switch 18 such that adjacent conductor rods are supplied with opposite polarity voltage from the power supply. Thus, as illustrated in the end view of the conductor rods in FIG. 2, diametrically opposite rods 16a and 16b are connected to one side of the A.C. power supply 17 and the second pair of diametrically opposite rods 16c and 16d are connected to the other side of such power supply. The use of four conductor rods 16, as illustrated, generates a quadrupole A.C. electrodynamic field within duct 12 which performs the mass-selective sorting of the charged particles and ions in the gas sample flow in the following manner. The voltage and frequency output of A.C. power supply 17 is set to a predetermined value whereby charged particles and ions in a particular predetermined relatively narrow range of charge-to-mass ratio are trapped at or near the center of the quadrupole field generated by rods 16. In the absence of a sufficient gas (air) flow rate, these particles would remain suspended in the quadrupole field against the force of gravity. However, due to the sufficient flow of the gas sample, such trapped charged particles are transmitted to expansion chamber 13 whereas the particles having charge-to-mass ratios outside of the particular range are filtered out (directed in a normal direction toward the side wall of duct 12) and therefore do not pass to the expansion chamber. Although only a quadrupole mass filter is described herein for the ion mass-selective sorting process, other two-dimensional multipolar A.C. electrodynamic fields, i.e., higher order fields, such as hexapole and octopole may possibly also be utilized. Also, in the case wherein the cross sectional area of duct 12 is large, additional rods 16 may be used to generate a plurality of quadrupole fields of sufficient intensity across substantially the total cross section of the duct.

The size of the trapped charged particles for a given set of parameters including a particular value of the A.C. voltage and frequency may be in the diameter range of 0.05 to 0.10 microns as one example. Decreasing the voltage and, or, increasing the frequency results in the selection of smaller diameter charged particles in ranges such as .01 to 0.05 microns, 0.005 to 0.01 microns, and so forth. The conductor rods 16a–d are equally spaced apart as shown in FIG. 2 and are preferably of equal diameter which may be in a range up to three-eighths inch, equal length, and the center-to-center spacing between adjacent rods is in a range up to 1 inch. In general, the spacing between rods is preferably considerably greater than the rod diameter in order to present a relatively open space between rods to minimize the gas flow impedance, especially in the case where multiple quadrupole fields are generated by the use of more than four rods. As in the case of conductors 14, the conductors 16 are supported and electrically insulated from the wall of duct 12 in the case wherein such duct is fabricated of an electrically conductive material. Again, as in the case of conductors 14, the conductors 16 may pass separately through the wall of duct 12 and the ends thereof connected to two common conductors connected to the A.C. supply 17, or the conductor ends may be retained in an electrically insulated frame member positioned along the inner surface of duct 12 and connected to common busses which pass through one or two opposite walls for interconnection to the A.C. source. The A.C. power supply 17 is controllably variable over a range of 0.5 to 5 kilovolts and a frequency range of 60 to 10,000 hertz.

The electrical force generated by the two-dimensional quadrupole A.C. electrodynamic field can be increased, and the particle trapping efficiency enhanced, by increasing the amplitude of the A.C. voltage applied to conductor rods 16 (and simultaneously decreasing the frequency when the same size particles are to be trapped). However, there is a limit to which the voltage can be increased for a particular spacing of bare conductor rods before breakdown occurs between adjacent conductors. Operation at higher voltages without breakdown is achieved by coating the conductors with a high dielectric strength material such as a plastic or silicon. The coating thickness may be in the order of 1 millimeter or less and permits an increase in the voltage applied thereto in the order of 50 percent or to the point where a continuous corona discharge occurs around the conductor rods. Operation at a sufficiently high A.C. voltage (which may exceed 5 kilovolts) to produce corona discharge will cause uncharged particles in the gas flow to become charged and therefore may obviate the need for the conductors 14 and their associated D.C. voltage supply 15. In the latter mode of operation, the voltage is preferably maintained constant, and the frequency varied for defining the particular ranges of charge-to-mass ratio.

A means 19 is preferably provided in communication with the wall of duct 12 adjacent the conductor rods 16 for collecting the (filtered out) charged particles which are not trapped by the particular parameters of voltage and frequency of the A.C. power supply 17. This collecting means 19 may be a chamber, as one example, formed in the bottom wall of duct 12 and having a hinged bottom wall for emptying the chamber of the collected particles. Other suitable particle collecting means would be the use of a chamber having an open end associated with a suitable bag or other collecting means into which the particles are directed.

If it is desired to narrow a particular range of charge-to-mass ratio of particles being analyzed, a D.C. voltage of up to several hundred volts may be applied between adjacent conductor rods 16 in addition to the A.C. voltage. The D.C. voltage may be supplied from a suitable D.C. power supply 20 through switch 21 and is of magnitude up to approximately one-fifth of the A.C. voltage.

The mass-selective sorting process which is accomplished at the entrance to the exapnsion chamber 13 results in a particle density in the expansion chamber corresponding to the number of particles of the charge-to-mass ratio per unit volume of the gas sample being transmitted through the quadrupole field plus any neutral particles which may exist in the gas sample flow and not be affected by the quadrupole field. The neutral particles may occur because the charge generated by electrified conductors 14 may not have encountered such particular particles and attached itself thereto. The neutral particle density can be determined by applying only a high D.C. voltage in the range of 2 to 10 kilovolts between adjacent rods 16 to assure that no charged particles reach chamber 13 during the neutral particle background determination. The neutral particles, since they are also saturated with the condensible vapor 11, have their relative number determined by the condensation nuclei counter associated with the expansion chamber 13 in the same manner as that utilized for the charged particles as will be described hereinafter.

The condensible vapor saturated particles enter expansion chamber 13 through valve 22 which is located within duct 12 at the output end thereof. A second valve 23 is located in a duct 24 connected to the output end of chamber 13. Duct 24 may be of elongated length as shown in FIG. 3 for providing an appreciable volume therein between valve 23 and a third valve 25, or may be of foreshortened length but include an enlarged portion 24a therein for defining such appreciable volume. A suitable pump 26 is located in the output end of duct 24 for drawing the gas sample into vessel 10 and through duct 12 into expansion chamber 13. The normal mode of operation of my apparatus is as follows: Assuming the D.C. power supply 15 and conductors 14 are utilized for the electrical charging of the condensible vapor saturated particles in the gas sample flow, such power supply is turned on, and its output set to a desired voltage. Alternatively, as described hereinabove, such D.C. power supply 15 and conductors 14 may not be utilized and the electrical charging of the particles is established by a high voltage operation of (coated) conductor rods 16. A.C. power supply 17 is turned on and adjusted for a particular voltage amplitude and frequency corresponding to a first range of charge-to-mass ratio to be analyzed and switch 18 is closed for applying such voltage to conductor rods 16. Valve 22 is initially in a closed position and valves 23 and 25 are open and pump 26 is energized for evacuating chamber 13 to approximately 80 percent of the ambient pressure. Upon reaching the prescribed vacuum, valve 23 is closed first and then valve 25. Pump 26 may continue in operation since a particle size measurement can be made in a matter of a second or less. The gas sample flow into expansion chamber 13 is now initiated by opening valve 22 for a time interval until the pressure in chamber 13 reaches substantially the ambient pressure external of vessel 10. After such time interval, which is readily predetermined, valve 22 is closed and chamber 13 is expanded by opening valve 23 while maintaining valve 25 closed. This expansion of chamber 13, or more precisely, expansion of the gas sample therein, produces cooling and supersaturation such that droplets condense on the previously condensible vapor saturated particles in the gas sample contained in chamber 13. The number of droplets correspond to a like number of particles in the gas sample and their relative number can be determined from a reading on a conventional condensation nuclei counter. If desired, the counter can be calibrated to read the absolute number of detected particles. The counter, chamber 13 and associated optics form the condensation nuclei detector. The condensation nuclei detection technique is thus a convenient method for measuring the number of particles although other conventional techniques may also be used.

A first embodiment of the condensation nuclei detector illustrated in FIG. 1 utilizes a high intensity light source 27 for directing a high intensity light into chamber 13, and a suitable photocell 28 and associated read-out 29 for detecting the scattered light reflected by the droplets in chamber 13. Light source 27 may be a xenon arc lamp or other suitable intense light source and its high intensity light output is directed through a window 30 in chamber 13 for illumination of the droplets within chamber 13. Photocell 28 is oriented 90° relative to light source 27 for detecting the light scattered off the droplets through window 31. Photocell 28 may typically be photomultiplier and preferably includes a lens for focussing the detected scattered light on the first stage of the photomultiplier. A suitable read-out 29 for the photocell 28 is connected to the output thereof for recording the photocell output current (or voltage) which corresponds to the number (or relative number) of detected droplets. Thus, the steady state output registered on read-out device 29, which is typically a counter, corresponds to the relative or absolute number of particles within the particular range of charge-to-mass ratio determined by the A.C. power supply parameters. Other read-out devices which provide a temporary record such as an oscilloscope, or provide a permanent record such as a print-out, may obviously also be used. After a recording of this first output of read-out device 29, valve 25 is opened for removing the particles within chamber 13 and for again evacuating chamber 13 to approximately 80 percent of the ambient pressure. At the same time the voltage and/or frequency of A.C. power supply 17 is adjusted for establishing the two-dimensional electrodynamic field that will trap the charged particles in a selected second range of charge-to-mass ratio.

The hereinabove described steps are thence repeated for different predetermined values of voltage and/or frequency of the A.C. power supply 17 such that the numbers of particles in various ranges of charge-to-mass ratio of interest are measured and thereby determine the size distribution of the particles in the gas sample introduced to vessel 10. As a final step, it may be desired to determine the neutral particle background which is generally present in each of the particular ranges of charge-to-mass ratio particle count measurements. This neutral background count measurement is obtained in the same manner as in the measurement of the charged particles in a particular range of charge-to-mass ratio with the exception that switch 18 is open and switch 21 closed for applying a high D.C. voltage across adjacent rods 16. This particular D.C. voltage is in the order of several thousand volts and upon its application to conductor rods 16 causes a high strength constant D.C. field which effectively sweeps out all of the charged particles and permits transmission only of the neutral particles to chamber 13.

Referring now to FIG. 3, there is shown a second embodiment of my apparatus for measuring the size distribution of particles using a two-dimensional alternating current multipolar electrodynamic field. This second embodiment is virtually identical with the FIG. 1 embodiment in its operation and the structure is similar with the exception of the following differences. The means for electrically charging the condensible vapor saturated particles in the gas sample flow is a radioactive source 32 which conveniently may be supported on the inner surface of duct 12. The means for generating the two-dimensional alternating current multipolar (quadrupole in this case) electric field are four electrically conductive strips 33 of material such as silver, carbon or transparent tin oxide suitably attached or painted along the inner surface of the duct 12, each being of equal width and length, equally spaced from each other in the 90° orientation of the rods in the FIG. 1 embodiment and disposed parallel to the longitudinal axis of duct 12. These four strips 33a–d are illustrated in the end view in FIG. 4 and adjacent strips are supplied with opposite polarity voltage from the A.C. power supply 17 as in the case of the four conductor rods 16 in the FIG. 1 embodiment for generating a similar type of quadrupole electrodynamic field. The third, and final distinction between the FIGS. 3 and 1 embodiments are in the means for sensing the droplets in expansion chamber 13. In the FIG. 1 embodiment, windows 30 and 31 are disposed in quadrature relationship for obtaining detection of the droplets by scattered light reflected from the droplets. In contradistinction, windows 30 and 31 are in alignment in the FIG. 3 embodiment and the detection of the droplets is determined by the absorption of the light emitted from intense light source 27 and passing through chamber 13. In general, the scattered light detection method is more sensitive than the absorption of light method. The light from source 27 which is not absorbed by the droplets within the range of the windows 30 and 31 is focussed by means of a lens on the first stage of the photomultiplier or other suitable photocell 28.

From the foregoing description, it can be appreciated that my invention makes available an improved and relatively simple method and apparatus for measuring the size distribution of articles including particulate matter occurring in a gaseous medium. The present apparatus uses a two-dimensional alternating current multipolar electric field near the entrance to a condensation nuclei detector as opposed to the three-dimensional field utilized in the apparatus disclosed and claimed in my concurrently filed patent application Ser. No. 222,768 wherein such three-dimensional field generating means is positioned within the expansion chamber 13 of the condensation nuclei detector. One of the advantages of the present invention is that the location of the two-dimensional field generating means near the entrance to the expansion chamber permits the mass-selective sorting to occur outside of the expansion chamber and thus this field generating component can easily be connected to the input of a conventional condensation nuclei detector, which comprises the expansion chamber and droplet detecting means, and no modifications have to be made to such detector. The input connections to the condensation nuclei detector can simply be made by the use of plastic flexible tubing.

Another advantage of my method and apparatus is that it can be automated and provide continuous particle size distribution analysis of a gaseous environment. The A.C. power supply voltage and, or, frequency settings can readily be programmed as well as the operation of the valves, and a permanent type read-out utilized, if desired. Advantages of my apparatus over the prior art particle size analyzer using mobility separation of the particles in a D.C. field are that my apparatus is not sensitive to the gas flow rate therethrough, the particle mass-selective sorting is not dependent on the proximity of the particles to an electrode, and the particles in a given range of charge-to-mass ratio are determined by a direct reading without requiring the difference between successive readings. Having described two particular embodiments of my invention, it is obvious that other conventional means for electrically charging the particles prior to their passage through the two-dimensional alternating current electric field as well as other conventional means for detecting the droplets within the exapnsion chamber and may also be utilized, and therefore it is to be understood that changes may be made in the particular embodiments as described which are within the full intended scope of the invention as defined by the following claims.

What I claim as new and desire to secure by Letters Patent of the United States is:

1. Apparatus for measuring the mass distribution of particles including particulate matter in a gas sample comprising
means for saturating a gas sample containing various particles including particulate matter with a readily condensible vapor,
a duct having an input end in communication with an output of said vapor saturating means,
means for electrically charging the particles in the gas sample,
an expansion chamber having an input in communication with an output end of said duct,
pump means in communication with an output of said expansion chamber for developing a flow of the gas sample from said vapor saturating means through said duct to said expansion chamber and therefrom,
means positioned within said duct for generating a two-dimensional multipolar alternating current electric field which traps charged particles in a particular range of charge-to-mass ratio and directs charged particles outside the particular range of charge-to-mass ratio to a side of said duct and thereby accomplishes mass-selective sorting of the charged particles, the flow of the gas sample causing the trapped particles to be directed to said expansion chamber, said two-dimensional field generating means comprising four electrodes oriented in 90° angularly spaced apart relationship and substantially parallel to the longitudinal axis of said duct and an alternating current power supply, adjacent electrodes of said four electrodes connected to opposite outputs of said power supply whereby said adjacent electrodes are supplied with opposite polarity alternating current voltage and the four electrodes generate a two-dimensional quadrupole alternating current electrodynamic field,
said particle electrical charging means comprising a high dielectric strength material coating on said four electrodes so as to permit application of a sufficiently high alternating voltage to cause corona discharge around said electrodes which electrically charges the particles,
means associated with said expansion chamber for causing expansion of the condensible vapor saturated gas sample therein to produce cooling and supersaturation thereof whereby droplets condense on the particles, and
means in communication with said expansion chamber for detecting the relative number of the droplets which correspond to a like relative number of the charged particles in the particular range of charge-to-mass ratio occurring in the gas sample.

2. The apparatus set forth in claim 1 wherein
said droplet detecting means comprises
an intense light source for providing illumination of the droplets in said expansion chamber,
photocell means for detecting the illuminated droplets in said expansion chamber, and
read-out means for establishing a count representing the relative number of particles detected by said photocell means.

3. The apparatus set forth in claim 2 wherein
said photocell means is oriented at 90° relative to said intense light source for detecting the light scattered off the droplets.

4. The apparatus set forth in claim 2 wherein
said intense light source and said photocell means are in alignment and disposed adjacent opposite sides of said expansion chamber for detecting the droplets by detecting the absorption of the light by the droplets.

5. The apparatus set forth in claim 1 wherein
said four electrodes are four cylindrical electrical conductors spaced in close proximity to inner surfaces of said duct.

6. The apparatus set forth in claim 5 wherein
said four cylindrical electrical conductors are equally spaced apart and are of equal diameter.

7. The apparatus set forth in claim 6 wherein
the diameter of said cylindrical electrical conductors is in a range up to three-eighths inch.

8. The apparatus set forth in claim 7 wherein
the center-to-center spacing between adjacent cylindrical electrical conductors is in a range up to 1 inch.

9. The apparatus set forth in claim 5 wherein
said cylindrical electrical conductors are not encased in electrical insulation.

10. The apparatus set forth in claim 1 wherein
the alternating current power supply is controllably variable over a range of 0.5 to 5 kilovolts and a frequency range of 60 to 10,000 hertz.

11. The apparatus set forth in claim 10 wherein
a particular value of the alternating current voltage and frequency determines a particular range of charge-to-mass ratio of particles to be trapped in the two-dimensional quadrupole alternating current electrodynamic field, and
means for varying the voltage and, or, frequency of said alternating current power supply whereas a decrease in the voltage and, or, increase in the frequency results in a second particular range of charge-to-mass ratio of the charged particles being trapped in the quadrupole field and directed to said expansion chamber.

12. The apparatus set forth in claim 1 and further comprising
a direct current power supply, and
switch means for connecting adjacent electrodes of said four electrodes to opposite outputs of said direct current power supply whereby said adjacent electrodes are further supplied with opposite polarity direct current voltage of magnitude up to approximately one-fifth of the alternating current voltage to thereby obtain a more narrow range of the charge-to-mass ratio of particles being analyzed.

13. The apparatus set forth in claim 1 and further comprising
first switch means for connecting said alternating current power supply to said electrodes,
a high votage direct current power supply having a voltage output in a range up to 10 kilovolts, and
second switch means for connecting said direct current power supply to said electrodes, adjacent electrodes of said four electrodes connected through said second switch means to opposite outputs of said direct current power supply whereby said adjacent electrodes are supplied with opposite polarity direct current voltage, an open state of said first switch means and closed state of said second switch means resulting in application of only a high direct current voltage between adjacent electrodes for generating a high strength constant direct current field which effectively sweeps out all of the charged particles and permits transmission to said expansion chamber of only any neutral particles in the gas sample for determination of the neutral particle background.

14. The apparatus set forth in claim 1 wherein said four electrodes consist of four elongated strips of electrically conductive material attached to inner surfaces of said duct.

15. The apparatus set forth in claim 14 wherein said four electrically conductive strips are equally spaced apart and are of equal width.

16. The apparatus set forth in claim 1 wherein said condensible vapor saturating means consists of a vessel partially filled with a relatively high vapor pressure liquid and having an input open to the gas sample being analyzed and an output connected to the input end of said duct.

17. The apparatus set forth in claim 1 wherein said gas sample expansion means comprises
a first valve connected at the input of said expansion chamber,
a second duct having an input end connected to the output of said expansion chamber,
a second valve connected in said second duct at an output of said expansion chamber, and
a third valve connected in said second duct adjacent an output end thereof, said pump means connected in said second duct downstream of said third valve, the second duct between said second and third valves forming a volume into which the gas sample in said expansion chamber is expanded.

18. The apparatus set forth in claim 17 wherein the second duct between said second and third valves is of elongated length for defining an appreciable volume.

19. The apparatus set forth in claim 17 wherein the second duct between said second and third valves is of foreshortened length but includes an enlarged portion for defining an appreciable volume.

* * * * *